3,181,942
METHOD OF CONTROLLING PLANT GROWTH
Ivan C. Popoff, Ambler, Pa., assignor to Pennsalt Chemicals Corporation, Philadelphia, Pa., a corporation of Pennsylvania
No Drawing. Filed Nov. 15, 1961, Ser. No. 152,668
9 Claims. (Cl. 71—2.3)

This invention deals with a novel method of controlling plant life and is concerned with the use of certain p-phenylenediamine derivatives as plant response agents, particularly as herbicides, defoliants and desiccants.

It is of great economic and social importance to develop new plant response agents. Our improved yields of crops and grains are due in large measure to the use of chemical plant control methods. These techniques involve not only use of chemicals to control weeds and unwanted vegetation, but also to effect defoliation, desiccation, etc.

It has now been found that plant responses may effectively be obtained by using chemical compounds derived from N,N'-disubstituted p-phenylenediamines. More particularly, the plant response agents used in this invention have the general formula

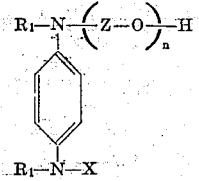

where $R_1$ is a member selected from the group of alkyl, cycloalkyl and aryl radicals, Z is a divalent hydrocarbon radical, X is H or

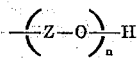

and $n$ is an integer from 1 to 10.

The preparation of these compounds is achieved readily by reaction of an alkylene oxide with an N,N'-disubstituted p-phenylenediamine, i.e. a compound of structure

where $R_1$ is the same as defined above. The p-phenylenediamine starting materials are well known and readily available by various means of synthesis; see, for example, U.S. Patents 2,498,630 and 2,867,604. Examples of p-phenylenediamines which may be used are (1) N,N'-dialkyl-p-phenylenediamines in which the substituent groups, which may be the same or different, include alkyl radicals selected from the group comprising methyl, ethyl, n-propyl, isopropyl, n-butyl, sec-butyl, tert-butyl, n-amyl, isoamyl, sec-amyl, tert-amyl, n-hexyl, n-octyl, t-octyl, 1-ethyl-3-methylpentyl, 1-methylheptyl, 1-methyloctyl, n-decyl, n-dodecyl, n-hexadecyl, octadecyl, tridecyl, and like radicals; (2) N,N'-dicycloalkyl-p-phenylenediamines in which the substituent groups are the same or different such as N,N'-bis-(cyclohexyl)-p-phenylenediamine, N-cyclohexyl-N'-methylcyclohexyl-p-phenylenediamine and the like; (3) N-alkyl-N'-cycloalkyl-p-phenylenediamines such as N-methyl-N'-cyclohexyl-p-phenylenediamine, N-sec-butyl-N'-methylcyclohexyl-p-phenylenediamine and the like; (4) N-alkyl-N'-aryl-p-phenylenediamines where the alkyl radicals are exemplified by any of the above-listed alkyl and cycloalkyl radicals and the aryl radicals are exemplified by phenyl, tolyl, xylyl, naphthyl, and the like; and (5) N,N'-diaryl-p-phenylenediamines where the aryl radicals are any of those listed above. Further specific illustrations of useful p-phenylenediamines are N-ethyl-N'-cyclopentyl, N,N'-diphenyl, N,N'-dinonyl, N,-N'-didodecyl, N-methyl-N'-sec-butyl, N-sec-butyl-N'-isopropyl, N,N-di(1-methyloctyl), N-tolyl-N'-cyclopentyl, N-phenyl-N'-undecyl, N-phenyl-N'-tolyl, and the like.

The alkylene oxides which are reacted with the p-phenylenediamine are well known compounds and are exemplified by the oxides of ethylene, propylene, the isomeric n-butylenes, isobutylene, n-amylenes, styrene, the isomeric methylstyrenes, the isomeric isopropylstyrenes, the isomeric naphthylstyrenes, and the like. Also useful are alkylene oxides such as butadiene monoxide. Of the above alkylene oxides we prefer to use those having the structure

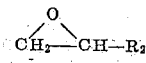

where $R_2$ is hydrogen or a hydrocarbon radical containing from one to eight carbon atoms.

The reaction of the alkylene oxide with p-phenylenediamine is carried out readily in accord with known procedures for alkylene oxide condensation reactions. In general, the reaction is carried out by simply subjecting a mixture of one mole of the p-phenylenediamine and one or more moles of the alkylene oxide to reaction at elevated temperatures under autogenous pressure. Usually the amount of alkylene oxide will be from one to twenty moles per mole of p-phenylenediamine. Reaction will occur at one or both N-H bonds to yield the substituted product and separation is easily effected by distillation. The molar amount of alkylene oxide used per mole of the p-phenylenediamine will, of course, determine the value of $n$ in the

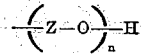

chain. Usually, however, an amount will be taken so that $n$ will vary between about 1 and 10. It will be understood that when less than two moles of alkylene oxide per mole of p-phenylenediamine derivative is used more of the mono-substituted compound will be formed together with a small amount of the disubstituted product.

It will be understood that if one $n$ is zero in the structure given above then the mono-substituted compounds are represented. Expressed another way, reaction of one mole of the alkylene oxide with one mole of the N,N'-disubstituted p-phenylenediamine yields mainly products having the structure

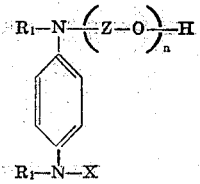

where $R_1$, Z and $n$ are the same as defined above and X is hydrogen.

The temperature of the reaction will be between about 25° and 250° C., the reaction proceeding more slowly at the lower temperatures. Although high pressure reactions may be used, it suffices to allow reaction to occur under autogenous pressure. If desired, solvent systems may be used and such solvents will, of course, be inert to the reactants and products. Useful solvents include the aromatic hydrocarbons such as benzene, toluene, xylene, etc.; ethers and cyclic ethers (e.g. dioxane), trialkylamines, and the like. When lower reaction temperatures are used, it is frequently desirable to use a catalyst and these will be inert basic compounds such as termines (trimethylamine, pyridine), alkali metal car- s, and the like or acidic type catalysts such as HCl, , as is well known in the art.

compounds as prepared by the above methods are ticular value as active ingredients for herbicides; r killing weeds among cultivated plants (i.e. selec- rbicides) and also for the complete elimination of red plant growth (i.e. nonselective herbicides). The esponse agents according to this invention may be ns, suspensions, emulsions or dusts, depending on eans desired for application. Thus, for example, complete inhibition of plant growth is desired, the may be incorporated in carriers which are toxic nts, such as high boiling mineral oils or in hydro- and halohydrocarbon solvents. For selective her- use, however, inert carriers will be preferred. It e understood, of course, that not all of the com- s defined above will have equal plant response ac- Although reference has been made to herbicidal y to illustrate the use of the agents, some agents will imited herbicidal activity, but will be active defoli- r desiccants. The specific application of the vari- pes of agents will be apparent from the illustrative les. The preferred agents for use in this invention those where $R_1$ is alkyl, cycloalkyl, or aryl radicals ing up to about eight carbon atoms, where Z is a it hydrocarbon radical containing two to three car- oms, and $n$ is one to four.

detailed techniques of using plant response agents ous formulations are well known in the art. Thus, ample, formulation of the active agents into her- and other plant response compositions is taught by in U.S. Patents Nos. 2,655,444 to 2,655,447. The dusts, solvents, wetting, dispersing and emulsifying for such preparations is also disclosed in U.S. 417. For example, mineral oil fractions such as ne or diesel oil, or coal tar oil and oils of vegetable mal origin can be used as solvents for solutions can be sprayed directly onto the plants. The ac- gredients according to this invention are added to ils direct or with the use of suitable axiliary sol- such as xylene. Solutions in lower boiling or also re expensive solvents such as alcohols, e.g. ethyl or pyl alcohol, ketones such as, e.g. acetone or cyclo- one, hydrocarbons, e.g. benzene, toluene, xylene, ydronaphthalene or alkylated naphthalenes and chlo- d hydrocarbons such as tetrachlorethane or ethylene le are less suitable for direct application but can be or combinations with suitable emulsifiers for the ction of concentrates which can be worked up for us emulsions.

eous application forms are made from emulsions ispersion concentrates by adding water to the sub- s as such or dissolved in one of the above named ts and are homogeneously incorporated into water, ably by means of wetting or dispersing agents. Ex- s of cation active emulsifiers or dispersing agents aternary ammonium compounds, examples of anion emulsifying agents are soap, soft soap, long chained tic sulphuric acid monoesters, araliphatic sulphonic long chained alkoxyacetic acids and examples of nic emulsifiers are polyglycol ethers of fatty alcohols lyethylene oxide condensation products. Also, con- tes can be produced consisting of active substance, fier or dispersing agent and, if necessary, solvent. latter are suitable for dilution with water.

ts can be produced by mixing or blending active nces with a solid carrier. Examples of such are: l, diatomaceous earth, kaolin, bentonite, calcium iate, boric acid, tricalcium phosphate or also saw- powdered cork, charcoal and other materials of ble origin. On the other hand, the carriers can be mated by means of a volatile solvent. Dusts and can be suspended in water by the addition of wetting and protective colloids and so used as spraying Liquid concentrates for aqueous emulsions and wettable powders for aqueous suspensions can be prepared both from liquid and solid active compounds. However liquid active substances or solid active substances are more suit- able for the preparation of liquid concentrates or of wet- table powders of higher concentration respectively. The various forms of applicaion can be adapted to the intended use in the usual way by the addition of substances which improve the distribution, the adhesive properties, resist- ance to rain, and, possibly, the resorption. Such sub- stances are: e.g. fatty acids, resins, wetting agents, glue, casein or alginates. In the same way, the biological ac- tivity can be increased or amplified by the addition of substances which have a bactericidal or fungicidal action or of substances which also influence the growth of plants, as well as by combination with fertilizers.

The concentration of active agent, will, of course, vary as will the rate of application depending upon the effect desired. In general, however, the active concentration will be between about 1% and 95% by weight of the formulation and will be applied to the plant at a rate suf- ficient to exert a plant response effect. Actual tests show these agents to be effective at application rates as low as about 1 pound per acre, but the usual rate of application will be between about 3 and 15 pounds per acre. A high- er rate of application can, of course, be used where local conditions warrant.

The following examples are given to more fully illus- trate the invention.

A. PREPARATION OF THE COMPOUNDS

*Example 1.—N,N'-bis-(sec-butyl)-N,N'-bis-(2-hydroxypropyl)-p-phenylenediamine*

One hundred g. (1.73 moles) propylene oxide is added over a two-hour period to 330 g. (1.5 moles) N,N'-bis-(sec-butyl)-p-phenylenediamine placed in a 0.5 gal. stirred autocalve at 180–200° C. The maximum autogenous pressure is 170 p.s.i.g. The stirring is continued for an additional four hours at 190° C. while the pressure drops to 5 to 10 p.s.i.g. The reaction product is fractionated by vacuum distillation and N,N'-bis-(sec-butyl)-N,N'-bis-(2-hydroxypropyl)-p-phenylenediamine, a brownish viscous oil, is obtained at 180° C. at 0.4 mm. Hg pressure. (Calc.: 71.4% C, 10.8% H, and 8.3% N. Found: 71.0% C, 10.5% H, and 8.3% N.) Also present in the reaction mixture is N,N'-di-(sec-butyl)-N-2-hydroxypropyl-p-phenylenediamine which is a brown, viscous oil, B.P. 140° C. at 0.4 mm. Hg pressure. The disubstituted product is also obtained in 100% yield by the same procedure using 2 moles of propylene oxide per mole of N,N'-bis-(sec-butyl)-p-phenylenediamine.

*Example 2.—N,N'-bis-(sec-butyl)-N,N'-bis-(2-hydroxyethyl)-p-phenylenediamine*

1.3 moles of ethylene oxide is reacted with 1.0 mole of N,N'-bis-(sec-butyl)-p-phenylenediamine in accordance with the procedure of Example 1. A yield of 26% of N,N'-bis-(sec-butyl)-N,N'-bis-(2-hydroxyethyl)-p-phenylenediamine is isolated by fractionation of the crude reaction product.

N,N'-bis-(sec-butyl) - N,N' - bis-(2-hydroxyethyl)-p-phenylenediamine is a brownish solid, B.P. 193° C. at 0.15 mm. Hg pressure, M.P. 73° C. (from n-hexane). (Calc.: 70.1% C, 10.4% H and 10.4% N. Found: 70.2% C, 10.4% H and 10.3% N.)

Also present in the crude product is N,N'-di-(sec-butyl)-N-(2-hydroxyethyl)-p-phenylenediamine, a brownish viscous oil, B.P. 155° C. at 0.2 mm. Hg pressure. (Calc.: 72.8% C, 10.6% H and 10.6% N. Found: 73.0% C, 10.3% H and 10.7% N.) The disubstituted compound is also obtained in 100% yield by the same procedure using 2 moles of ethylene oxide per mole of N,N'-di-sec-butyl-p-phenylenediamine.

Example 3.—N,N'-bis[3-(5-methyl)heptyl]-N,N'-bis(2-hydroxyethyl)-p-phenylenediamine This product is obtained by the same procedure as described for Example 1 using 2.2 moles of ethylene oxide per mole of N,N'-bis[3-(5-methyl)heptyl]-p-phenylenediamine. The crude product, obtained in 96% yield, is fractionated to isolate the pure N,N'-bis-[5-(methyl)heptyl]-N,N'-bis(2-hydroxyethyl)-p-phenylenediamine in 73% yield. It is a viscous brownish oil boiling 230° C. at 0.1 mm. Hg pressure. Calc.: 74.3% C and 6.6% N. Found: 74.2% and 6.67% N. The absence of —NH group and the presence of —OH group is confirmed by infrared analysis.

Example 4.—Reaction product of N,N'-bis[3-(5-methyl)heptyl]-p-phenylenediamine with 5.8 moles ethylene oxide The product is obtained in 100% crude yield by essentially the same procedure used in Example 1 by reacting 5.8 moles of ethylene oxide with one mole of N,N'-bis[3-(5-methyl)heptyl]-p-phenylenediamine. The product is a brown viscous oil.

Example 5.—Reaction product of N-phenyl-N'-cyclohexyl-p-phenylenediamine with four moles of ethylene oxide To a mixture of 133 g. (0.5 mole) of N-phenyl-N'-cyclohexyl-p-phenylenediamine and 10 g. (0.1 mole) of triethylamine held at 190° to 200° C. in a 1 gal. autoclave is added with stirring 88 g. (2 moles) of ethylene oxide. As the reaction proceeds, the addition of ethylene oxide is adjusted so that the pressure does not exceed 120 p.s.i.g. After all the ethylene oxide is added, stirring is continued until the pressure drops to about 35 p.s.i.g. and the triethylamine is then distilled off. The distillation residue in the autoclave is the crude reaction product consisting of a mixture of compounds having the structure

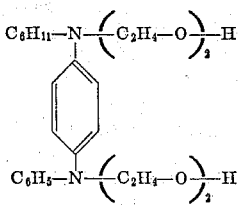

and

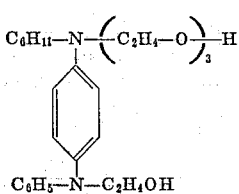

B. EVALUATION OF AGENTS

Example 6.—Herbicide—pre-emergence and post-emergence contact kill

A 5% by weight xylene emulsion concentrate of N,N'-di-sec-butyl-N,N'-bis(2 - hydroxypropyl) - p - phenylenediamine was prepared and for pre-emergence testing used to treat soil surface in which was planted seeds of weeds and crops. For post-emergence contact tests, weeds and crops four to eight inches high were treated with the emulsion. The following table gives the data and results obtained:

TABLE I

| Rate of application [1] | Weed or crop | Percent kill |
|---|---|---|
| A. Pre-emergence: | | |
| 10 lbs./acre | Crabgrass | 50 |
| | Foxtail | 60 |
| | Lamb's-quarter | 40 |
| B. Post-emergence: | | |
| 5 lbs./acre | Crabgrass | 100 |
| | Foxtail | 95 |
| 7.5 lbs./acre | Flax | 100 |
| | Spinach | 75 |

[1] All rates of application based on active ingredient.

Example 7.—Desiccant activity

The emulsion of Example 6 was emulsified with water as carrier and sprayed onto bean foliage at a rate of 5 lbs./acre. Desiccant activity was indicated by 75% of foliage burn.

Example 8.—Herbicide—contact kill

A formulation of 10% by weight of N,N'-di-sec-butyl-N-2-hydroxyethyl-p-phenylenediamine in isophorone with 10% by weight of a surfactant (a blend of a non-ionic and sulfonate type surfactant) was evaluated against weeds and crops as described in Example 6. The data follow:

TABLE II. CONTACT KILL EFFECTS OF N,N'-DI-SEC-BUTYL-N-2-HYDROXYETHYL-P-PHENYLENEDIAMINE

| Rate/acre | Weed or crop | Percent kill |
|---|---|---|
| 10 lbs | Crabgrass | [1] 100 |
| | Foxtail | [1] 90–100 |
| 5 lbs | Crabgrass | 90 |
| | Lamb's-quarter | 100 |
| | Foxtail | 80 |
| | Spinach | 60 |

[1] Some regrowth.

Example 9.—Herbicide—contact kill

At 5 lbs./acre applied as an emulsion concentrate of 10% by weight in butyl alcohol with 10% by weight of isooctyl phenyl polyethoxy ethanol as surfactant and under the test conditions of Example 6, N,N'-di-sec-butyl-N,N'-bis(2-hydroxyethyl)-p-phenylenediamine gave 60% kill of foxtail and 50% kill of lamb's-quarter.

Example 10.—Herbicide—pre-emergence

A 10% by weight emulsion in xylene of N,N'-bis[3-(5-methyl)heptyl]-N,N'-bis(2 - hydroxyethyl)-p-phenylenediamine was sprayed onto Amaranthus weed at 10 lbs./acre and 100% kill was obtained.

Example 11.—Herbicide—pre-emergence

Weed seeds were planted in soil treated at 10 lbs./acre with a 10% by weight acetone emulsion of N,N'-bis-[3-(5-methyl)heptyl]-N - 2 - hydroxypropyl - p - phenylenediamine. Pre-emergence herbicide activity was indicated by 75% kill of foxtail, 85% kill of crabgrass, 80% kill of lamb's-quarter, 70% kill of purslane and 60% kill of pigweed.

Example 12.—Herbicide—pre-emergence and contact

A 10% by weight emulsion concentrate of N-phenyl-N'-cyclohexyl-N'-2-hydroxyethyl-p-phenylenediamine in diacetone alcohol with 10% by weight of a polyoxyethylene sorbitol septaoleate surfactant was evaluated as Example 6. The following table gives the data and results obtained:

TABLE III

| Rate/acre | Weed or crop | Percent kill |
|---|---|---|
| Pre-emergence: | | |
| 2 lbs | Crabgrass | 80 |
| | Lamb's-quarter | 80 |
| | Purslane | 70 |
| | Pigweed | 60 |
| | Sugar beet | 100 |
| | Cotton | 80 |
| | Soy bean | 30 |
| | Peas | 20 |
| Post: | | |
| 2 lbs | Crabgrass | 30 |
| | Lamb's-quarter | 100 |
| | Flax | 100 |

*Example 13.—Defoliant effects*

Emulsions of 10% by weight of N,N'-di-sec-butyl-N-2-hydroxyethyl-p-phenylenediamine in xylene with 10% by weight of an alkyl aryl polyether alcohol surfactant was dispersed in water and was applied to the foliage of cotton plants at a rate of 5 pounds of active ingredient per acre. A significant defoliant action was evident in 10 days.

It will be understood that numerous variations and modifications may be made from the above description and examples without departing from the spirit and scope of the invention.

I claim:
1. The method of controlling plant growth which comprises bringing into contact with said plant in an amount sufficient to control said growth, a compound having the formula

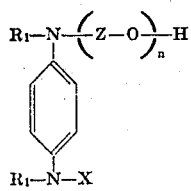

where $R_1$ is a hydrocarbon member selected from the group of alkyl, cycloalkyl, and aryl, said hydrocarbon member containing up to eighteen carbon atoms, Z is a saturated divalent hydrocarbon containing two to three carbon atoms, X is a member selected from the group consisting of H and

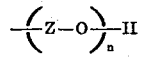

and $n$ is an integer from 1 to 4.

2. The method of claim 1 wherein X is hydrogen.
3. The method of claim 2 wherein the compound is N,N'-di-sec-butyl-N-2-hydroxyethyl-p-phenylenediamine.
4. The method of claim 2 wherein the compound is N,N'-bis-[3-(5-methyl)heptyl]-N - 2 - hydroxypropyl - p - phenylenediamine.
5. The method of claim 2 wherein the compound is N - phenyl-N'-cyclohexyl-N'-2-hydroxyethyl-p-phenylenediamine.
6. The method of claim 1 wherein X is a

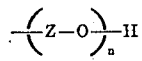

radical.

7. The method of claim 6 wherein the compound is N,N' - di-sec-butyl-N,N'-bis-(2-hydroxypropyl)-p-phenylenediamine.
8. The method of claim 6 wherein the compound is N,N'-di-sec-butyl-N,N-bis(2 - hydroxyethyl) - p - phenylenediamine.
9. The method of claim 6 wherein the compound is N,N'-bis[3-(5-methyl)heptyl]-N,N'-bis(2-hydroxyethyl) - p-phenylenediamine.

References Cited in the file of this patent
UNITED STATES PATENTS

| 2,163,166 | Wilmanns | June 20, 1939 |
| 2,348,843 | Paul | May 16, 1944 |
| 2,929,796 | Ambelang | Mar. 22, 1960 |
| 3,121,116 | Pawloski | Feb. 11, 1964 |